United States Patent [19]

Jensen et al.

[11] 4,355,690
[45] Oct. 26, 1982

[54] STACK FOLDING OUTRIGGER SYSTEM

[75] Inventors: Thomas C. Jensen; Phillip E. Stevens; Henry J. Landry, Jr., all of Ankeny, Iowa

[73] Assignee: Deere & Company, Moline, Ill.

[21] Appl. No.: 217,717

[22] Filed: Dec. 18, 1980

[51] Int. Cl.³ .............................................. A01B 73/00
[52] U.S. Cl. .................................... 172/311; 172/456
[58] Field of Search .............. 172/126, 130, 311, 446, 172/456, 662, 776, 294; 280/411 R, 411 A, 411 B, 411 C, 412, 413, 656

[56] References Cited

U.S. PATENT DOCUMENTS 1,430,311 9/1922 Mann .............................. 280/411 R
4,271,711 6/1981 Vavra .............................. 172/311 X

FOREIGN PATENT DOCUMENTS

487602 1/1976 U.S.S.R. .............................. 172/456

Primary Examiner—Richard T. Stouffer

[57] ABSTRACT

To create a compact package for transport and storage of a foldable agricultural implement such as a field cultivator or the like, a pair of hydraulically operated 180° fold hinges of different heights connect the outrigger frames to the ends of the main frame of the implement. The hinges lift the outrigger frames up and sequentially stackfold one on top of the other in generally parallel relationship above the main frame.

20 Claims, 10 Drawing Figures

STACK FOLDING OUTRIGGER SYSTEM

BACKGROUND OF THE INVENTION

The present invention relates generally to agricultural implements having outrigger frames hinged to a main frame or toolbar, and more specifically to a folding system for sequentially stackfolding the outrigger frames over the main frame.

The trend in agriculture toward increased ground working widths has required that implements be foldable to decrease width during transport and storage. Often outrigger frames or wings are hinged to the ends of a main frame and fold up, for example, approximately 90° from the horizontal. However, one problem which occurs with the use of such implements is that the wings significantly increase height when in the storage position. This presents problems where low telephone or electric wires are present and in storage buildings with low door clearance or low ceilings. To reduce the height, the transport width must often be increased by providing a wide main frame with narrower folding wings. However, the increased main frame width is a problem in areas where narrow roads, gates or bridges or the like are present, or where local regulations limit the width of vehicles.

It is therefore an object of the present invention to provide a folding outrigger system which has reduced height and width for transport or storage.

It is yet another object to provide outrigger system which permits a relatively wide implement to be folded into a stable and compact package for transport and storage.

It is still a further object to provide an implement with outrigger frames located at the end of a main frame and hinged so that they stackfold one on top of the other in generally parallel relationship above the main frame.

It is another object of the invention to provide an improved folding implement with a main frame and a pair of outriggers pivotally connected to the main frame, wherein the combined lateral dimension of the outrigger is greater than the width of the main frame, but wherein the storage or transport width is approximately equal to the main frame width.

It is another object of the invention to provide a folding implement having a pair of outrigger frames hinged to a main frame, wherein the outrigger frames have lateral dimensions approaching that of the main frame and yet are swingable upwardly about the hinges into a storage configuration such that the height of the implement in the storage configuration is substantially decreased over that of conventional implements of comparable width.

A pair of hydraulically operated 180° fold hinges of different heights connect a pair of tool-carrying outrigger frames to the respective ends of a main frame. First, the outrigger frame connected to the shortest hinge is folded approximately 180° from the horizontal field-working position to its storage position directly over the frame. The opposite outrigger frame is then folded to a position generally parallel to the first-folded outrigger frame and directly above the tools supported by the first-folded frame.

The stackfold configuration results in decreased transport and storage height and width for a given implement groundworking width. The present system permits the width of each outrigger to approach the width of the main frame without sacrificing transport and storage convenience.

These and other objects, features and advantages will become apparent from the detailed description which follows taken in connection with the accompanying drawings.

DESCRIPTION OF THE PREFERRED EMBODIMENT

Referring to the drawings, there is shown a drawn chisel plow 10 including a main or center frame 12 supported for vertical movement on ground-engaging wheel assemblies 14 in a conventional manner. The main frame 12 includes a lower tool frame 16 and an upper hinge frame 18 connected by brackets 20 (FIGS. 5 and 6) or other suitable connecting means. The tool frame 16 includes transversely extending box-beams 22 welded to fore-and-aft extending box-beams 24 to form a generally rectangular structure. Hitch beams 26 (FIG. 4) extend forwardly to a connecting portion (not shown) adapted for attaching to the hitch of a tractor 28. Although the present invention is described in relation to a drawn chisel plow, it is to be understood that it is applicable to other implements, including those with tractor-mounted tool bars or tool frames.

Figure 3:
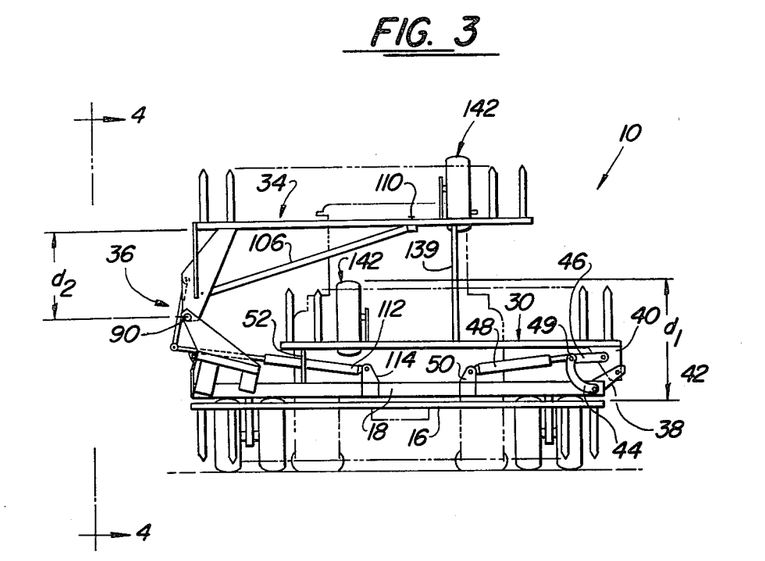
FIG. 3 is also a view similar to FIG. 1 but showing the outriggers folded 180° to their transport positions above and generally parallel to the main frame.
Figure 4:
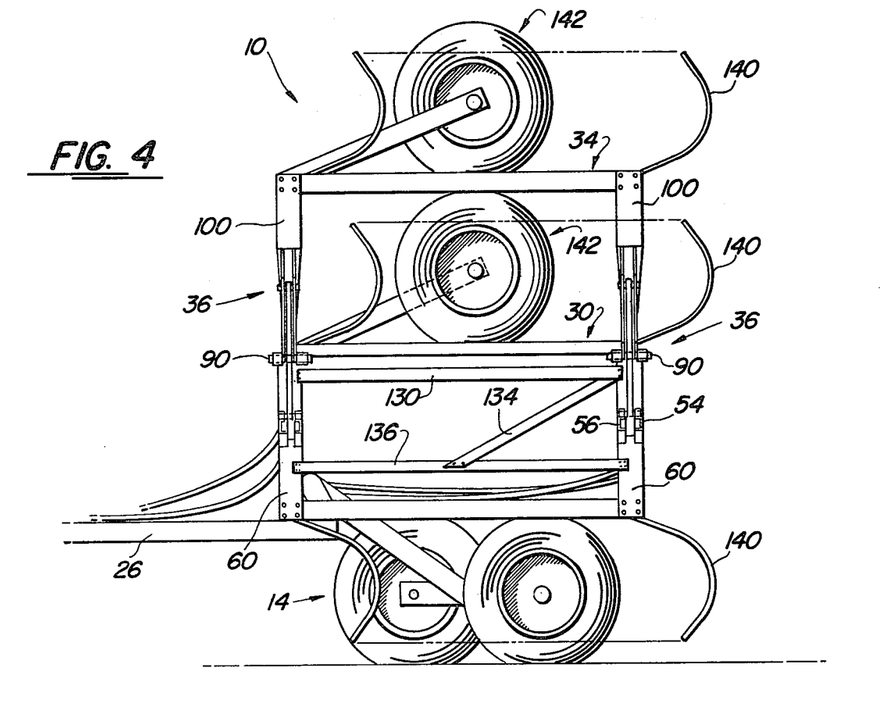
FIG. 4 is a side view of the implement in the transport position taken along lines 4—4 of FIG. 3.
Figure 5:
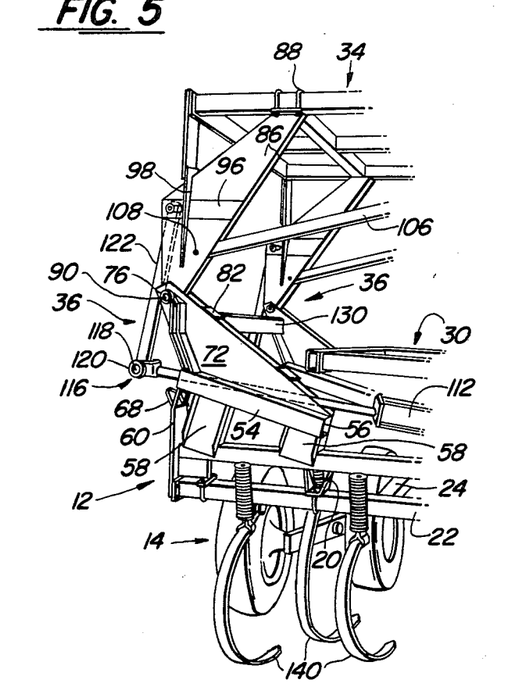
FIG. 5 is a rear perspective view of the left hinge area of the implement shown in FIG. 1.

A first outrigger frame 30 is connected to the main frame 12 by two 180° fold hinges 32. A second outrigger frame 34 is connected by two elevating 180° fold hinges 36 to the main frame 12. The hinges 32 are conventional and are of the type such as utilized with the commercially available John Deere horizontal-folding Model 1610 Chisel Plow. Each hinge 32 includes outwardly and upwardly directed side plates 38 connected to the main frame 12. Upwardly directed side plates 40 are connected to the first outrigger 30. The side plates 38 and 40 are pivotally connected above the level of and outwardly of the main frame 12 by a fore-and-aft extending hinge pin 42. Pairs of links 44 and 46 are pivotally connected to the main frame 12 and to the side plates 40. The links 44 and 46 are pivotally connected together and to the rod end of a hydraulic cylinder 48 by a pin 49 extending through the pairs of links and the rod end. The anchor end of the cylinder 48 is connected by a bracket 50 to the hinge frame 18. The hinges 32 are generally transversely aligned with the hinges 36 (FIG. 4). The cylinders 48 are in the maximum extended positions (FIG. 1) when the first outrigger frame 30 is in the horizontal field-working position. As the cylinder 48 is retracted, the pivotally connected ends of the links 44 and 46 are pulled to the left, causing the outrigger 30 to pivot about 180° from the horizontal field-working position to the folded transport position (FIG. 3) above and generally parallel to the main frame 12. The hinge pin 42 is vertically offset from the frames 12 and 30 sufficiently to lift the outrigger frame 30 to a position above and out of interfering relationship with the hinge frame 18. A pair of support stands 52 connected to the main frame 12 prevents the outrigger frame 30 from folding beyond the 180° position and provide support for the frame during transport and storage.

The elevating hinges 36 which support the second outrigger frame 34 from the main frame 12 are substantially identical and so only one will be described in detail. Each hinge 36 includes a pair of spaced channel-shaped members 54 and 56 carried above the main frame 12 by U-shaped supports 58 welded to the hinge frame 18. The members 54 and 56 open toward each other (FIG. 7) and form a transversely extending roller guide or channel, slotted at 59, which angles upwardly from the inner supports 58 toward the outermost end above the end of the main frame 12. A vertical plate 60 connected to main frame end plate 62 by bolts 64 is welded to and supports the channel members 54 and 56 at the upper end of the roller guide. A vertical slot 66 is provided in the plate 60 between the members 54 and 56 in alignment with the slot at 59. Ears 68 are welded on either side of the vertical slot 66 and include upwardly directed surfaces 70 forming a ramp which leads to the roller guide formed by the members 54 and 56.

Hinge sideplates 72 and 74 are welded to and extend upwardly from the members 54 and 56, respectively. The outermost ends of the sideplates 72 and 74 extend outwardly just beyond the plane of the vertical plate 60 (FIG. 6) and support hinge bearings 76. Reinforcing ribs 80 are welded to the sideplates 72 and 74 and members 54 and 56, respectively, and to the corresponding bearings 76 to strengthen the hinge. Spacer plates 82 are welded to and maintain the desired spacing between the sideplates 72 and 74.

Each hinge 36 also includes a pair of parallel sideplates 86 connected by a bracket 88 to the second outrigger frame 34. The plates 86 extend upwardly and to the right as viewed in FIG. 6 with the uppermost ends of the plates located between the sideplates 72. A bushing 88 is located between the plates 86 (FIG. 7) and is aligned with the hinge bearings 76. A hinge pin 90 extends in the fore-and-aft direction through the hinge bearings 76 and the bushing 88. End plates 92 and 94 are welded to and space the plates 86. Transverse reinforcing bars 96 are welded to the plates 86 and are directly across from the channel-shaped members 54 and 56 when the outrigger is in the position shown in FIG. 6. Vertical reinforcing bars 98 are welded to the outside of each of the plates 86. A vertical plate 100 is connected by bolts 102 to an end plate 104 of the outrigger frame 34. The plate extends upwardly from the frame 34 to the bottom of the plates 86 where it is welded to the vertical reinforcing bars 98. A diagonal brace 106 is connected at one end between the upper portion of the side plates 86 by a bolt 108. The opposite end of the brace 106 is connected by a bracket 110 to the outrigger frame 34 near its outermost end.

Figure 2:
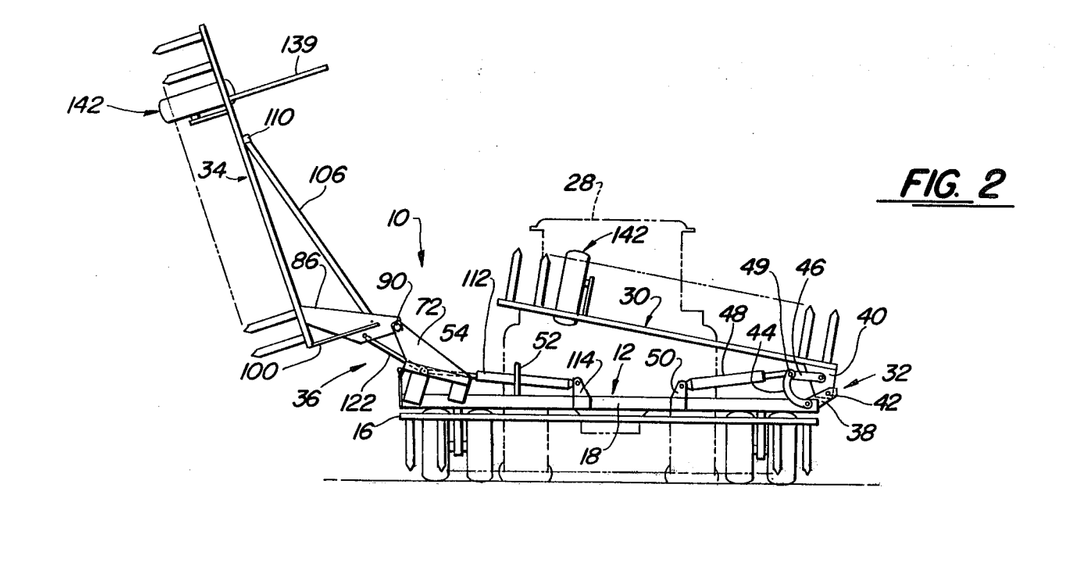
FIG. 2 is a view similar to FIG. 1 but showing the outriggers as they are folded between the field-working and the transport position.
Figure 6:
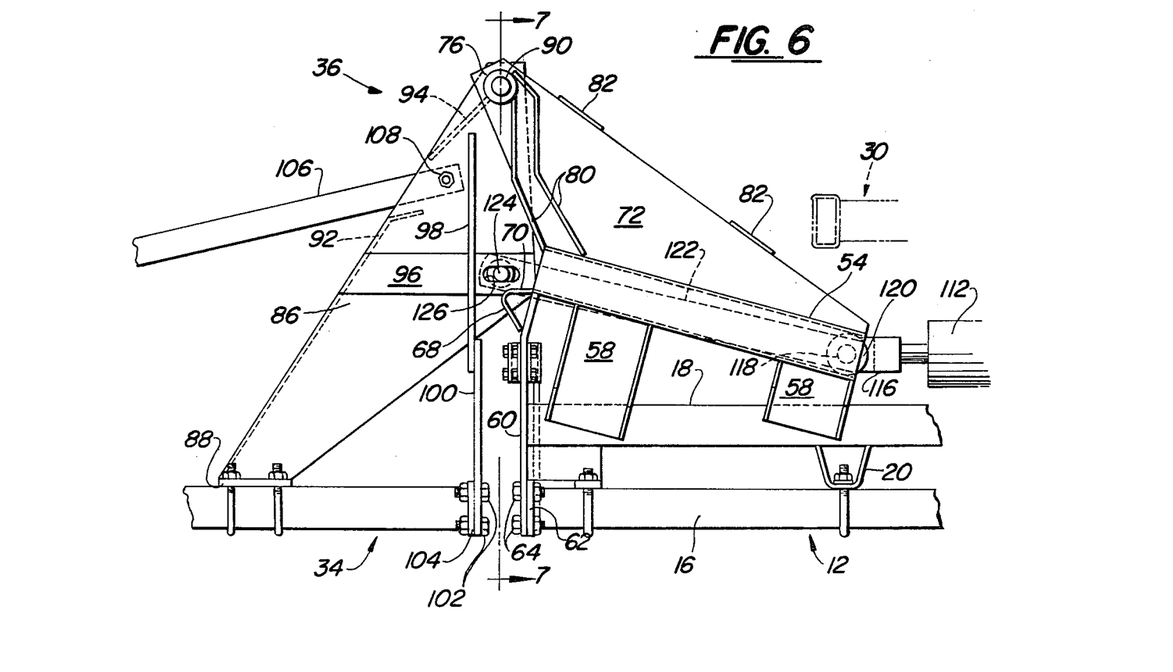
FIG. 6 is an enlarged rear view of the hinge area shown in FIG. 5.

The anchor end of hydraulic cylinder 112 is connected by a bracket 114 to the hinge frame 18. The rod end of the cylinder 112 carries a clevis 116. A cylinder pin 118 passes through and supports rollers 120 on either side of the clevis 116. The rollers 120 are spaced apart so that they are supported by the lower inside surface of the respective channel-shaped members 54 and 56 (FIG. 6). The distance between the upper and lower inner surfaces of the members 54 and 56 is slightly larger than the diameter of the rollers 120. As the cylinder 112 is extended to the left from the position shown in FIG. 6, the rollers 120 follow the slotted channel formed by the members 54 and 56 causing the rod end of the cylinder 112 to lift with respect to the main frame 12. The slot between the members 54 and 56 permits the cylinder rod to rise above the top of the members as the cylinder 112 is extended (FIG. 2).

A transversely extending link 122 (FIG. 6) is pivotally connected at the innermost end to the clevis 116 between the rollers 120 by the pin 118. The opposite end of the link 122 extends between the sideplates 86 and is pivotally connected thereto by a link pin 124. The pin 124 is supported below the hinge pin 90 (FIG. 6) in transversely elongated slots 126 is the sideplates 86 and the transverse reinforcing bars 96 so that limited pivoting of the outrigger about the pin 90 is permitted when the cylinder 112 is retracted. As the cylinder 112 is extended from the position shown in FIG. 6, the link 122 moves toward the left and pivots the outrigger 34 about the hinge pin 90 (FIG. 2). The clevis 116 is constrained by the rollers 120 and the members 54 and 56 to move upwardly along the channel which maintains a more direct in-line relationship between the link 122 and the cylinder 122 as the cylinder is extended. The channel also helps to maintain alignment of the elevating hinge components during folding and unfolding.

Figure 1:
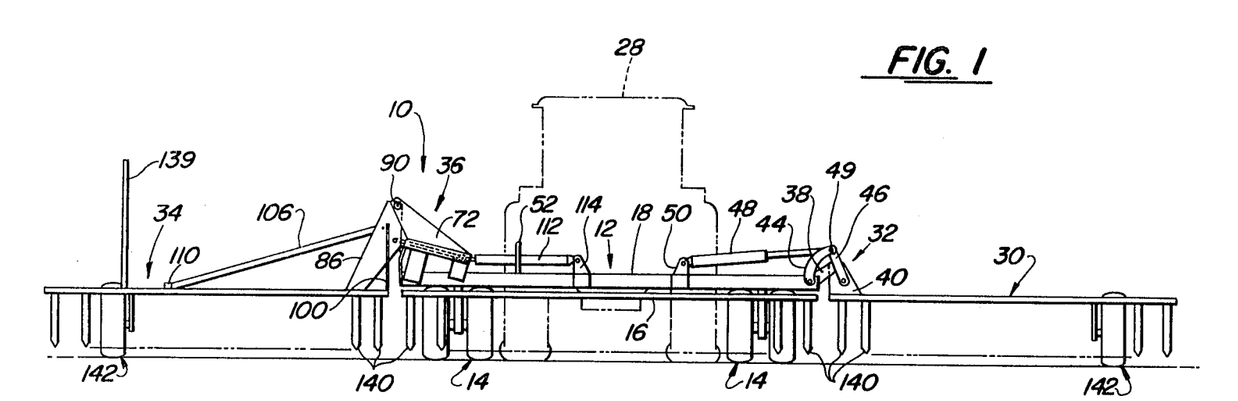
FIG. 1 is a rear view of a chisel plow in which the present invention is embodied and showing the outriggers in the horizontal field-working position.

As the cylinder 112 is extended and the outrigger frame 36 pivots beyond about 90° from the horizontal field-working position shown in FIG. 1, the center of gravity of the outrigger frame will shift to the right of the hinge pin 90 causing the link 122 to be in tension rather than compression. The center of the link 122 rests against the bushing 88 between the sideplates 86. As the cylinder 112 is further extended, the rollers 120 are no longer constrained by the members 54 and 56. The link 122 pivots in the clockwise direction (FIG. 5) about the bushing 88 permitting the outrigger frame to pivot to the 180° folded position (FIG. 3). Retraction of the cylinder 112 pivots the link 122 counterclockwise about the bushing 88 to rock the outrigger frame 34 upwardly about the hinge pin 90. The ears 68 guide the rollers 120 into the channel formed by the members 54 and 56. As the center of gravity of the outrigger frame shifts outwardly of the pin 90, the link 122 is placed in tension between the rollers 120 and the link pin 124. Continued retraction of the cylinder 112 permits the outrigger frame to pivot in the counterclockwise direction to the field-working position (FIGS. 1 and 6).

Figure 7:
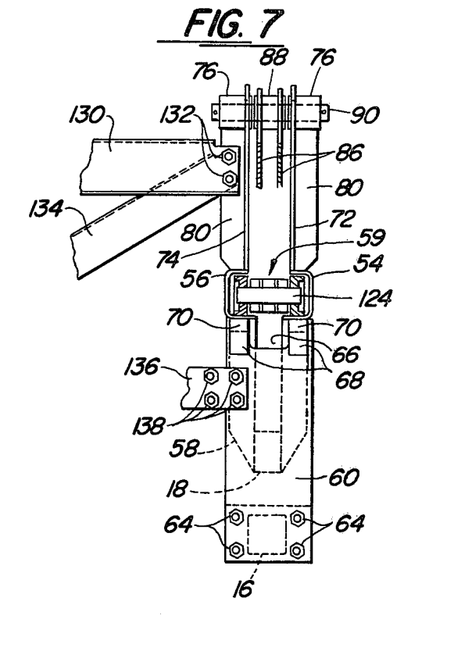
FIG. 7 is a view taken substantially along the lines 7—7 of FIG. 6.

Two identically operating elevating hinges 36 are extended and retracted in unison by a hydraulic sequencing system described in detail below. The hinges 36 are connected by an upper fore-and-aft extending brace 130 attached to the respective reinforcing ribs 80 by bolts 132 (FIG. 7). A diagonal brace 134 is attached at one end to the rear hinge 36 by the bolts 132. The opposite end is connected to a lower fore-and-aft extending brace 136 attached at its opposite ends by bolts 138 to the vertical end plates 60. Support stands 139 are mounted on the second outrigger frame 34 for contacting the first folded frame 30 (FIG. 3) and preventing the frame 34 from pivoting beyond about 180° when the implement is folded to the transport position. The stands 52 and 139 position and support the outrigger frames above and parallel to the main frame 12 during transport and storage.

Earth-working tools 140 are carried by the lower frame 16 and by the outrigger frames 30 and 34. Ground wheel assemblies 142 are mounted on the outrigger frames 30 and 34 to support and provide depth control for the frames. In the preferred embodiment the wheel assemblies 14 and 142 are hydraulically operated by series-connected cylinders, as described in U.S. Pat. No. 3,666,284 issued on May 30, 1972 and assigned to the assignee of the present invention, to provide on-the-go depth control and to lower and raise the tools between ground-engaging and non-engaging (FIG. 1) positions. The hinges 32 and 36 permit limited pivoting of the outrigger frames 30 and 34 so the implement can flex over uneven terrain while in the field-working position.

The tools 140 and the ground wheel assembly 142 for the outrigger frame 30 extend above the frame 16 a distance $d_1$ (FIG. 3) when the outrigger is in the transport position. The axis of the hinge pin 90 of each hinge 36 is offset a distance $d_2$ above the frame. The distance $d_2$ is selected to be at least $\frac{1}{2}d_1$ so the outrigger frame 34 will be raised above the tools 140 and assembly 142 as it is pivoted 180° from the field-working position (FIG. 1) to the transport position (FIG. 3).

Figure 8:
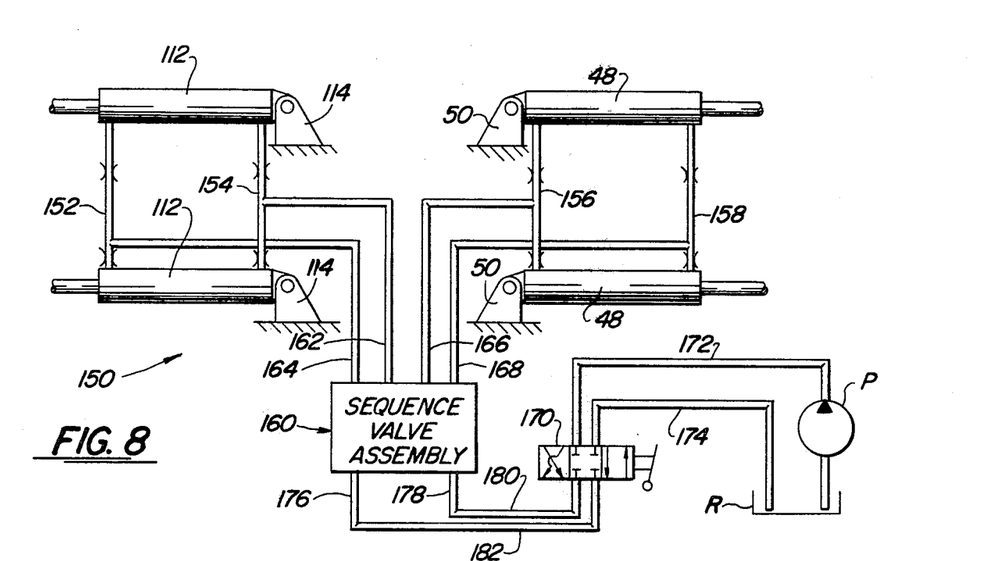
FIG. 8 is a schematic of the hydraulic system for the implement shown in FIGS. 1-7.

The hydraulic control system 150 (FIG. 8) for folding and unfolding the outrigger frames 30 and 34 includes hydraulic lines 152 and 154 connecting the rod ends and the anchor ends, respectively, of the cylinders 112. Hydraulic lines 156 and 158 connect the anchor ends and the rod ends respectively, of the cylinders 48. A sequence valve assembly 160 has four output ports 162, 164, 166 and 168 connected to the lines 154, 152, 156 and 158, respectively. A conventional flow control valve 170 is connected to a source of hydraulic pressure P and a reservoir or sump R by hydraulic lines 172 and 174. The valve 170 is connected to input ports 176 and 178 by lines 180 and 182.

The sequence valve assembly 160 controls flow to the cylinders 48 and 112 to assure that the outrigger frame 30 reaches its folded position prior to the outrigger frame 34 so that the two outriggers do not interfere with each other during folding. When the outrigger frames 30 and 34 are unfolded from the position shown in FIG. 3, the valve assembly 160 assures that the outrigger frame 34 moves out of the path of the outrigger frame 30.

Figure 9:
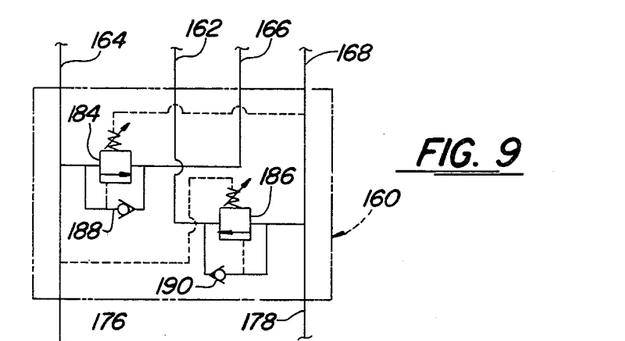
FIG. 9 is a schematic of the sequence valve assembly shown in FIG. 8.

In the preferred embodiment, the sequence valve assembly 160 includes sequence valves 184 and 186 (FIG. 9) and check valves 188 and 190 connected between the input ports 176 and 178 and output ports 162–168. To unfold the implement from the transport position, the valve 170 is moved to the right (FIG. 8) to supply hydraulic pressure to the input port 176 directly to the output port 164 to retract the cylinders 112. Return flow from the cylinders 112 travels through the ball-check valve 190 to the port 178 and to the reservoir R. The cylinders 112 retract until the outrigger frame has pivoted to the horizontal field-working position (FIG. 1). Pressure builds at the sequence valve 184 to turn on the valve and direct flow to the port 166 and to the anchor end of the cylinders 48. The cylinders 48 extend to pivot the outrigger frame 30 from the folded position to the field-working position.

To fold the implement from the field-working position (FIG. 1) to the transport position (FIG. 3), the valve 170 is moved to the left (FIG. 8) to pressurize the input port 178 and the output port 168, and open the port 176 to the reservoir. The cylinders 48 retract to pivot the outrigger frame 30 to the 180° folded position. Return flow from the cylinders 48 passes to the port 176 through the check valve 188. When the cylinders 48 are fully retracted, pressure builds to operate the sequence valve 186 and direct hydraulic fluid flow to the port 162 to extend the cylinders 112 and fold the outrigger frame 34 over the first folded outrigger frame 30.

Figure 10:
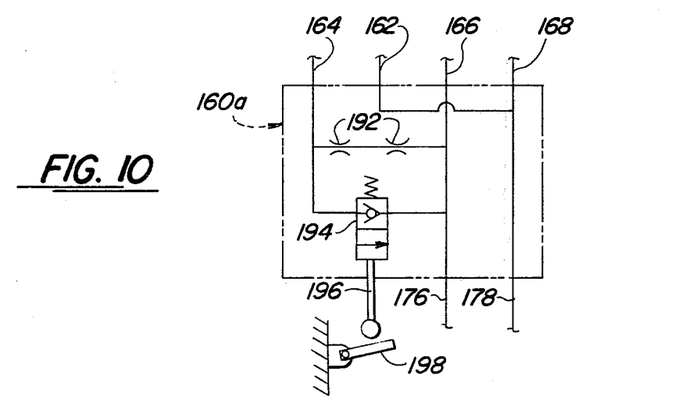
FIG. 10 is an alternate embodiment of the sequence valve assembly shown in FIG. 8 which permits the outriggers to be raised together during the initial part of the fold cycle.

In an alternate embodiment of the sequence valve assembly 160a (FIG. 10), flow is controlled to the cylinders 48 and 112 so that the outrigger frames 30 and 34 fold from the field-working position at the same rate for about the first 5° of travel. Thereafter, the left outrigger frame 34 is pivoted at a slower rate than the right outrigger frame 30 so the latter reaches the transport position first. During unfolding, both outrigger frames pivot at approximately equal rates.

The sequence valve assembly 160a includes restrictors 192 connected in parallel with a two-position valve 194 between the input port 176 and the output port 164. The valve 194 includes an actuator 196 operated by a contact portion 198 which moves with a one of the hinges 32 or 36. The valve actuator 196 and the contact portion 198 are so situated that the valve 194 will be in the position shown in FIG. 10 with the ball check in the line whenever the hinge is folded from the field-working position beyond about 5° from the horizontal. Between the horizontal field-working position and the 5° folded position, the contact portion 198 depresses the actuator 196 to allow free flow through the valve 194. The valve 194 and its operation by the contact portion 198 are fully described in a co-pending application Ser. No. 171,591, filed July 23, 1980, now U.S. Pat. No. 4,320,805 entitled FOLDING SEQUENCE CONTROL FOR WING FOLD IMPLEMENTS and assigned to the assignee of the present invention.

With the implement in the storage position (FIG. 3), it is unfolded by applying pressure to the ports 164 and 166 through the valve 170 and the valve assembly 160a. Fluid flows freely from the input port 176 directly to the output port 166, and right to left through the ball check of the valve 194 to the output port 164 to retract the cylinders 112 and extend the cylinders 48 so that both outrigger frames 30 and 34 pivot at about the same rate towards the field-working position. When in the field-working position, the actuator 196 is depressed so that the restrictors 192 are bypassed. As the input port 178 is pressurized by moving the actuator of the valve 170 toward the left (FIG. 8) flow is provided to the cylinders through the output ports 162 and 168 while return flow from the cylinders passes freely through the ports 164 and 166 to the port 176 so the outrigger frames 30 and 34 pivot upwardly together at about the same rate. When the outrigger frame associated with the contact portion 198 pivots sufficiently to permit the actuator 196 to extend, flow is checked by the ball check of the valve 194 so that return flow from the cylinders 112 must pass through the restrictors 192. The rate of extension of the cylinders 112 is then slowed with respect to the rate of retraction of the cylinders 48 so that the right outrigger frame 30 reaches the 180° storage position before the left outrigger frame 34. For a more detailed description of the valve 194 and its operation, reference may be had to the aforementioned co-pending application Ser. No. 171,591, incorporated herein by reference. Turns in the headlands are facilitated by permitting the outrigger frames to fold together during the intial portion of the fold cycle.

Having described the preferred embodiment, it will be apparent that modifications can be made without departing from the scope of the invention as defined in the accompanying claims.

I claim:

1. In a foldable farm implement having a main frame and first and second outrigger frames, first means hingedly connecting the first outrigger frame to one end of the main frame for swinging approximately 180° about a first substantially horizontal axis between an outwardly extended position in substantial transverse horizontal alignment with the main frame and a storage position directly above and generally parallel to the main frame, second means hingedly connecting the second outrigger frame to the opposite end of the main frame for swinging approximately 180° about a second substantially horizontal axis between an outwardly extended position in substantial transverse horizontal alignment with the main frame and a storage position above the first outrigger frame, wherein the second means comprises a hinge having a pivot with an axis which corresponds to the second axis, said hinge also having a portion connected to the outrigger frame and extending downwardly therefrom, and a reciprocable hydraulic cylinder having first and second ends, the first end connected to the main frame, a link connected between the second end and the hinge portion, and guide means for raising the second end of the cylinder as it is extended.

2. The invention as set forth in claim 1 wherein the second horizontal axis is elevated above the main frame and substantially above the first horizontal axis.

3. In a foldable farm implement adapted for forward movement over the ground and having a laterally extending horizontal main frame with first and second ends and first and second transverse outrigger frames with depending earth-working tools, first means hingedly connecting the first outrigger frame to the first end of the main frame for swinging about a first axis between a transversely outward working position with the tools extending in a downwardly direction with respect to the main frame and a storage position above and parallel to the main frame with the tools extending in an upwardly direction a first distance above the main frame, and second means hingedly connnecting the second outrigger frame to the second end of the main frame for swinging between a working position transversely outwardly of and parallel to the main frame and a substantially transverse and horizontal storage position above the upwardly extending tools on the first outrigger frame, said second means including a fore-and-aft extending pivot connecting the second outrigger and main frames, said pivot offset vertically a second distance above the second outrigger frame and a third distance above the main frame, wherein the total of said second and third distances is at least equal to or greater than said first distance.

4. In a foldable farm implement adapted for forward movement over the ground and having a laterally extending center frame, and first and second tool-carrying outrigger frames with tools fixed thereto, said outrigger frames having combined lateral dimension greater than the lateral dimension of the center frame, first means rockably connecting the first outrigger frame to one end of the center frame for swinging the first outrigger frame substantially 180° between an outwardly extended position in transverse alignment with the center frame and a storage position above the main frame, and second means pivotally connecting the second outrigger frame to the opposite end of the main frame for swinging the second outrigger frame substantially 180° between an outwardly extended position in transverse alignment with the main frame and a storage position above the storage position of the first outrigger frame and generally parallel to the center frame, wherein the tools extend downwardly with respect to the main frame when the outrigger frames are in the outwardly extended positions and upwardly with respect to the main frame when the frames are in the storage positions, wherein the second means includes means for lifting the second outrigger frame above the upwardly extended tools of the first outrigger frame as the second outrigger is swung towards the storage position, and wherein the first and second means comprise first and second hinges, respectively, each having a fore-and-aft extending pivot about which the respective outrigger frames rock, wherein the second pivot is vertically offset a preselected distance from the center frame and above a horizontal plane passing through the axis of the first pivot, said distance above the horizontal plane being substantial compared to the distance between the center frame and the upward extremities of the upwardly extended tools of the first outrigger frame in the storage position.

5. The invention as set forth in claim 4 wherein the outrigger frames are substantially level with the center frame and carry earth-working tools which extend downwardly from the outrigger frames when in the outwardly extended position, and wherein the tools carried by the first outrigger extend upwardly above the main frame a preselected distance when the first outrigger is in the storage position, said means for lifting the second outrigger comprising brackets extending upwardly from the center frame and the second outrigger frame, and a pivot located greater than at least approximately half the preselected distance above the main frame connecting the brackets so that the second outrigger frame is lifted above the main frame at least the preselected distance upon being folded about the pivot from the outwardly extended position to the storage position.

6. In a foldable farm implement having a laterally extending main frame, and first and second outrigger frames, first means connecting the first outrigger to the main frame for movement between a field-working position wherein the outrigger extends outwardly of and in substantial transverse alignment with the main frame and a storage position above and generally parallel to the main frame, soil contacting means extending downwardly from the first outrigger when in the field-working position and upwardly therefrom a preselected distance above the main frame when in the storage position, hinge means for pivotally connecting the second outrigger frame to the main frame for swinging between a field-working position outwardly of and in substantial transverse alignment with the main frame and a storage position above and generally parallel to the main frame and above the first outrigger frame when the latter is in the storage position, said hinge means including a fore-and-aft extending pivot connecting the main frame and the outrigger frame and located above the main frame a distance at least half the preselected distance for lifting the second outrigger frame above the storage position of the first outrigger frame as it is swung towards the storage position.

7. The invention as set forth in claim 6 including operable hydraulic motor means for sequentially moving the first and second outrigger frames between the field-working and storage positions, and fluid control means for operating the motor means during folding of the implement to swing the first outrigger frame to its storage position before the second outrigger frame reaches the storage position.

8. The invention as set forth in claim 7 wherein the fluid control means includes means for operating the motor means to move the first and second outrigger frames in unison during a first portion of the fold cycle.

9. The invention as set forth in claim 7 further comprising first support means located between the main frame and the first outrigger frame for preventing the first outrigger frame from folding beyond its storage position, and second support means located between the first and second outrigger frames for preventing the second outrigger frame from folding beyond its storage position.

10. The invention as set forth in claim 9 wherein the first support means comprises a first stand connected to and extending upwardly from the main frame, and wherein the second support means comprises a second stand connected to the second outrigger frame and extending upwardly therefrom when the second outrigger frame is in the field-working position, said second stand including a contact portion for contacting the first outrigger frame in the storage position.

11. In a foldable farm implement having a main frame and first and second outrigger frames, said outrigger frames having inboard and outboard ends, first means hingedly connecting the inboard end of the first outrigger frame to one end of the main frame for swinging substantially 180° about a first fore-and-aft extending horizontal axis between an outwardly extended position in transverse horizontal alignment with the main frame and a storage position directly above and parallel to the main frame with the inboard end directly above the respective end of the main frame, second means hingedly connecting the second outrigger frame to the opposite end of the main frame for swinging substantially 180° about a second fore-and-aft extending horizntal axis between an outwardly extended position in substantial transverse horizontal alignment with the main frame and a storage position above the first outrigger frame, wherein the second means comprises a hinge having a pivot with an axis which corresponds to the second axis, said hinge also having a hinge portion connected to the outrigger frame and offset vertically from the pivot, and a hydraulic cylinder having an anchor end connected to the main frame, and a rod end, a link connected between the rod end and the hinge portion, and guide means for raising the second end of the cylinder as it is extended.

12. The invention as set forth in claim 11 wherein the second horizontal axis is elevated above the main frame and above the first horizontal axis.

13. In a foldable farm implement having a laterally extending center frame, and first and second outrigger frames having combined lateral dimension greater than the lateral dimension of the center frame, first means rockably connecting the first outrigger frame to one end of the center frame for swinging the first outrigger frame approximately 180° between an outwardly extended position in substantial transverse alignment with the center frame and a storage position above the main frame, and second means pivotally connecting the second outrigger frame to the opposite end of the main frame for swinging the second outrigger frame between an outwardly extended position in substantial transverse alignment with the main frame and a storage position above the storage position of the first outrigger frame and generally parallel to the center frame, wherein the outrigger frames are substantially level with the center frame and carry earth-working tools which extend downwardly from the outrigger frames when in the outwardly extended position, and wherein the tools carried by the first outrigger extend upwardly above the main frame a preselected distance when the the first outrigger is in the storage position, wherein the second means includes means for lifting the second outrigger frame above the storage position of the first outrigger frame as it is swung towards the storage position, said means for lifting the second outrigger comprising brackets extending upwardly from the center frame and the second outrigger frame, and a pivot located greater than at least approximately half the preselected distance above the main frame connecting the brackets so that the second outrigger frame is lifted above the main frame at least the preselected distance upon being folded about the pivot from the outwardly extended position to the storage position.

14. The invention as set forth in claim 13 wherein the first and second means comprise first and second hinges, respectively, each having a fore-and-aft extending pivot about which the respective outrigger frames rock, wherein the second pivot is vertically offset from the center frame and above a horizontal plane passing through the axis of the first pivot.

15. The invention as set forth in claim 13 or 14 including operable hydraulic motor means for sequentially moving the first and second outrigger frames between the outwardly extended and storage positions, and fluid control means for operating the motor means during folding of the implement to swing the first outrigger frame to its storage position before the second outrigger frame reaches the storage position.

16. The invention as set forth in claim 15 wherein the fluid control means includes means for operating the motor means to move the first and second outrigger frames in unison during a first portion of the fold cycle.

17. The invention as set forth in claim 15 further comprising first support means located between the main frame and the first outrigger frame for preventing the first outrigger frame from folding beyond its storage position, and second support means located between the first and second outrigger frames for preventing the second outrigger frame from folding beyond its storage position.

18. The invention as set forth in claim 17 wherein the first support means comprises a first stand connected to and extending upwardly from the main frame, and wherein the second support means comprises a second stand connected to the second outrigger frame and extending upwardly therefrom when the second outrigger frame is in the field-working position, said second stand including a contact portion for contacting the first outrigger frame in the storage position.

19. In a foldable farm implement having a laterally extending and generally rectangular main frame having front and rear transversely extending beams, vertically adjustable wheel means for supporting the main frame in a substantially horizontal position above the ground and for raising and lowering the frame between ground-working and transport positions, first and second outrigger frames having a combined transverse dimension substantially greater than the lateral dimension of the main frame, first means connecting the first outrigger frame to the main frame for movement between the field-working position wherein the outrigger extends outwardly of and in substantial transverse alignment with the main frame and a storage position above and generally parallel to the main frame, soil-contacting means connected to and extending downwardly from the first outrigger when in the field-working position, said soil-contacting means extending upwardly a preselected distance above the main frame when the first outrigger is in the storage position, hinge means for pivotally connecting the second outrigger frame to the main frame for swinging between a field-working position outwardly of and in substantial transverse alignment with the main frame and a storage position above and generally parallel to the main frame and above the first outrigger frame when the latter is in the storage position, said hinge means including first and second fore-and-aft extending pivots connected to adjacent ends of the front and rear beams, respectively, said pivots being in axial alignment and located above the main frame a distance at least half the preselected distance for lifting the second outrigger frame above the storage position of the first outrigger frame as it is swung towards the storage position.

20. The invention as set forth in claim 19 wherein the first means comprises pivot means pivotally connecting the first outrigger frame to the ends of the front and rear beams opposite the ends connected to the first and second pivots, said pivot means having a pivotal axis located substantially below a horizontal plane passing through said first and second pivots for positioning the first outrigger frame in closely overlying relationship with the main frame when said outrigger is in the storage position.

* * * * *